US00RE40124E

(19) United States
(12) Reissued Patent
Kaiser et al.

(10) Patent Number: US RE40,124 E
(45) Date of Reissued Patent: Mar. 4, 2008

(54) PROCESS AND INSTALLATION FOR RECOVERY AND PURIFICATION OF ETHYLENE PRODUCED BY PYROLYSIS OF HYDROCARBONS, AND GASES OBTAINED BY THIS PROCESS

(75) Inventors: Victor Kaiser, Maisons Laffitte (FR); Jean-Paul Laugier, Paris (FR); Yvon Simon, Les Loges en Josas (FR)

(73) Assignee: Technip, Courbevoie (FR)

(21) Appl. No.: 10/813,689

(22) Filed: Mar. 31, 2004

Related U.S. Patent Documents

Reissue of:
(64) Patent No.: 6,578,378
Issued: Jun. 17, 2003
Appl. No.: 10/000,790
Filed: Dec. 4, 2001

(30) Foreign Application Priority Data

Dec. 7, 2000 (FR) ..... 0015922

(51) Int. Cl.
*F25J 3/00* (2006.01)

(52) U.S. Cl. ..... 62/622; 62/630; 62/935
(58) Field of Classification Search ..... 62/935, 62/622, 630, 620
See application file for complete search history.

(56) References Cited

U.S. PATENT DOCUMENTS 4,167,402 A * 9/1979 Davis
5,253,479 A * 10/1993 Di Cintio et al. ..... 62/631
5,452,581 A * 9/1995 Dinh et al. ..... 62/631
5,678,424 A * 10/1997 Nazar ..... 62/630
5,689,032 A * 11/1997 Krause et al.
5,884,504 A * 3/1999 Nazar

FOREIGN PATENT DOCUMENTS

EP 377949 * 7/1990
EP 624562 * 11/1994
EP 675094 * 10/1995

* cited by examiner

*Primary Examiner*—Cheryl Tyler
*Assistant Examiner*—Michael J. Early
(74) *Attorney, Agent, or Firm*—Leydig, Voit & Mayer, Ltd.

(57) ABSTRACT

A process for the high-yield recovery of ethylene and heavier hydrocarbons from the gas produced by pyrolysis of hydrocarbons in which the liquid products resulting from the fractionated condensation of a cracking gas for the recovery of almost all the ethylene, are supplied to a distillation column, called a de-ethanizer, at different intermediate levels. At the top of the de-ethanizer the vapor of the column distillate is treated directly in an acetylene hydrogenation reactor, the effluent containing virtually no acetylene being separated by a distillation column called a de-methanizer, into an ethylene- and ethane-enriched tail product, while the head product is recycled by compression or treated for subsequent recovery of ethylene.

12 Claims, 2 Drawing Sheets

PROCESS AND INSTALLATION FOR RECOVERY AND PURIFICATION OF ETHYLENE PRODUCED BY PYROLYSIS OF HYDROCARBONS, AND GASES OBTAINED BY THIS PROCESS

Matter enclosed in heavy brackets [ ] appears in the original patent but forms no part of this reissue specification; matter printed in italics indicates the additions made by reissue.

FIELD OF THE INVENTION

This invention concerns in general and in a first of its aspects, the chemical industry and, in particular, a method for high-yield recovery and purification of ethylene as well as other products originating from a gas produced by pyrolysis of hydrocarbons. This invention also concerns an installation and equipment for exploiting this method on an industrial scale.

BACKGROUND

A large number of papers and patents addressing the production, recovery, and purification of olefins show their industrial importance and the problems encountered in the exploitation of the various processes.

Recently, the production capacity of ethylene units has attained and even exceeded the level of 1 million tons per year for a single line; which requires a new approach in the design of the process, equipment, and the controllability of the unit.

In systems of recovery and purification, particularly for ethylene, the elimination of acetylene is a key element in purification. Because of its relative volatility with respect to ethylene and ethane, it cannot be separated by distillation. In industrial practice, only two processes are applied: absorption of acetylene by a solvent and hydrogenation to ethylene and ethane.

The first method involves the use of a solvent which is usually N,N-dimethylformamide (DMF) or N-methylpyrrolidone (NMP), which allows for preferential recovery of dissolved acetylene.

The second method, catalytic hydrogenation, is generally carried out by treatment of all the gas from cracking before separation of the hydrogen contained in it, or a separate treatment of the cuts containing $C_2$ hydrocarbons after addition of sufficiently pure hydrogen to transform all the acetylene into ethylene and ethane. These two types of hydrogenation use palladium-based catalysts with different formulations.

The stage of hydrogenation of acetylene has also been the subject of a number of papers and inventions dealing with the catalyst system and the formulations of the catalyst, and exposing the specific disadvantages connected with each of the hydrogenation technologies.

Thus, in the case of treatment of all the cracking gas originating from the pyrolysis of hydrocarbons in a hydrogenation reactor, a racing reaction may occur, corresponding to an acceleration of the kinetics of the reaction transforming the acetylene into ethylene (and also undesirable secondary reactions) because of a significant increase in the temperature of the catalyst together with the presence of a large excess of hydrogen (50 to 100 times the quantity required by stoichiometry). The ethylene can then be transformed into ethane and may thereby cause a significant rise in temperature, which requires immediate depressurizing of the reactor to prevent an explosion.

In the case of treatment of the $C_2$ cut alone, polymerization of the acetylene and progressive deactivation of the catalyst may occur, because of the large concentration of unsaturated hydrocarbons in the cut to be treated, which necessitates regeneration or periodic replacement of the catalyst charge. Generally, a reserve reactor is installed to avoid interrupting production. In addition, it is necessary to use a purified hydrogen current for the reaction, and these two aspects tend to increase the investments for reserve equipment or the equipment used only for the purpose described.

SUMMARY OF THE INVENTION

The present invention overcomes the disadvantages of the known previous techniques by purification of the ethylene-rich fraction at an intermediate stage of the process.

Thus the invention concerns, according to one of its aspects, a process for fractionation of a large anhydrous gas resulting from pyrolysis of hydrocarbons containing hydrogen and hydrocarbons, particularly $C_1$ to $C_3$ hydrocarbons, including ethylene, propylene, and acetylene, and at least one current enriched with hydrogen and/or methane, at least one current enriched with ethylene and poor in acetylene, and at least one propylene-rich current, including stages wherein:

a) the gas resulting from the pyrolysis of hydrocarbons under pressure is cooled and liquefied progressively by passage into a series of increasingly colder heat-exchange zones. At least one condensate is separated from the pyrolysis gas after passage into each heat-exchange zone, at least one of the condensates being propylene-enriched and at least one other condensate being ethylene and ethane enriched, and containing in solution a smaller proportion of hydrogen, methane, and acetylene, and the residual hydrogen-rich gas is collected;

b) at least part of the ethylene- and ethane-enriched condensate and the propylene-enriched condensate is evaporated by a decrease in pressure. They are reheated, independently or not, in at least one of the heat-exchange zones by thermal exchange with fluids to be cooled, including at least the gas resulting from the pyrolysis, to provide, respectively, a fraction that is at least partly evaporated due to the reduction in pressure and reheating of the ethylene- and ethane-enriched fraction, and a fraction that is at least partly evaporated due to the reduction in pressure and the reheating of the propylene-enriched fraction, to provide at least part of the cold needed for cooling and for progressive liquefaction of at least said gas resulting from the pyrolysis of hydrocarbons upon passage into said successive heat-exchange zones;

c) the fractions which are at least partly evaporated, resulting from stage (b), are introduced into part of a distillation column called a de-ethanizer, the ethane- and ethylene-rich partly evaporated condensate being admitted into a point of the part of the distillation column called the de-ethanizer, higher than the propylene-enriched partly evaporated condensate, the part of the distillation column called the de-ethanizer operating under conditions of temperature and pressure allowing the separation, in an upper part, of a first current of ethylene- and ethane-enriched head gas containing, in a smaller proportion, acetylene, hydrogen, and methane, and in a lower part, a first bottom current of propylene-enriched fluid, which is collected;

d) the first current of ethylene- and ethane-enriched head gas from stage (c) in a zone of acetylene elimination by extraction with solvent and/or by selective hydrogenation of the acetylene by means of hydrogen containing in the first gaseous head current, to provide a current essentially devoid of acetylene, and e) in the part of the distillation column called the de-methanizer, the gas current which is essentially devoid of acetylene from stage (d) is cooled and fractionated in a second hydrogen- and/or methane-enriched head gas fraction, which is collected, and a second bottom liquid fraction which is enriched with ethylene and ethane, and is essentially devoid of acetylene, and which is also collected.

The charge gas is generally essentially free of water to prevent deposits of ice in the low-temperature circuits. Thus, a water content lower than 10 ppm by volume, preferably less than 1 ppm, is desirable.

According to one of its aspects, the process according to the invention may use the gas current from the pyrolysis of hydrocarbons at a pressure of 15–50 bar, preferably 28–38 bar, and the distillation zone called the de-ethanizer may be at a pressure of 10–30 bar, preferably 14–24 bar, lower than the pressure of the pyrolysis gas.

According to one of its aspects, the process according to the invention may use evaporated condensates introduced into the part of the distillation column called the de-ethanizer; these condensates contain dissolved hydrogen in a proportion such that the first head gas current contains 2 to 10%, preferably 4 to 5%, in moles, of hydrogen, and stage (d) may be implemented by essentially ethylene-selective hydrogenation of the acetylene contained in the first head gas current by means of the hydrogen contained in the first head gas current of stage (c), the temperature of the hydrogenation zone being between 0 and 160° C., inclusive.

According to one of its aspects, the process according to the invention may use the hydrogen dissolved in the evaporated condensates introduced into the part of the distillation column called the de-ethanizer, so that it is the only hydrogen used for the hydrogenation carried out in stage (d).

according to one of its aspects, the process according to the invention may be implemented by sending into the top of the de-ethanizer of stage (c) two or three condensates obtained after successive passage of the pyrolysis gas, respectively, into two or three last heat-exchange zones of stage (a), considering that the first heat-exchange zone is the one which is first to be in contact with the pyrolysis gas.

The pyrolysis gas may be, for example, a naphtha or ethane pyrolysis gas.

According to one of the aspects of the process according to the invention, the second head gas fraction from the de-methanizer may be purified by distillation to recover ethylene and ethane.

According to one of the aspects of the process according to the invention, the pyrolysis gas may be an ethane pyrolysis gas, or a gas for pyrolysis of the ethane/propane mixture, and the second head gas fraction from the de-methanizer may be mixed with the pyrolysis gas without ethylene recovery, for a new treatment in mixture with the pyrolysis gas in stage (a).

According to one of the aspects of the process according to the invention, the hydrogen content of the first head gas current from the de-ethanizer may be increased by the addition of hydrogen from the head of a fluid separator, this fluid coming from the cooling in a heat-exchange zone of the residual gaseous fluid resulting from refrigeration in the successive heat-exchange zones of the pyrolysis gas.

According to one of the aspects of the process according to the invention, part of the second bottom liquid fraction from the de-methanizer is recycled into the de-ethanizer, to reduce the acetylene concentration of the first head gas current from the de-ethanizer.

According to one of the aspects of the process according to the invention, stage (d) can be carried out by extraction of the acetylene by means of a solvent.

According to one of the aspects of the process according to the invention, the carbon monoxide concentration contained in the first head gas current may have a moderating effect on the catalyzed reaction rate in the acetylene elimination zone.

According to another of its aspects, this invention concerns an installation for the fractionation of a gas resulting from pyrolysis of hydrocarbons containing hydrogen and hydrocarbons, particularly $C_1$ to $C_3$ hydrocarbons, including ethylene, propylene, and acetylene, and at least one current enriched with hydrogen and/or methane, at least one current enriched with ethylene and poor in acetylene, and at least one current enriched with propylene, comprising:

a) means for progressively cooling and liquefying the gas from the pyrolysis of hydrocarbons under pressure by passage into a series of increasingly colder heat-exchange zones, means for separating from the pyrolysis gas at least one condensate after passage into each heat-exchange zone, at least one of the condensates being propylene-rich and at least one other condensate being ethylene- and ethane-rich, and containing in solution a smaller proportion of hydrogen, methane, and acetylene, and means for collecting the hydrogen-rich uncondensed residual gas;

b) means to evaporate, at least in part, by reduction in pressure, the ethylene and ethane-rich condensate and the propylene-rich condensate, and means to heat them independently in at least one of the heat-exchange zones by thermal exchange with the fluids to be cooled, to provide, respectively, a fraction that is at least partly evaporated due to the reduction in pressure and the heating of the ethylene- and ethane-rich fraction, and a fraction at least partly evaporated due to the reduction in pressure and the heating of the propylene-rich fraction, to provide at least part of the cold necessary for progressive cooling and liquefaction of at least the gas resulting from the pyrolysis of hydrocarbons upon its successive passage into the heat-exchange zones, (c) means to introduce the partly evaporated fractions resulting from stage (b) into part of a distillation column called the de-ethanizer, the partially evaporated ethylene- and ethane-rich condensate being admitted at a point of the part of the distillation column higher than the partly evaporated propylene-rich condensate, the part of the distillation column operating under conditions of temperature and pressure permitting the separation, in an upper part, of a first ethylene- and ethane-rich head gas current containing, in a lower proportion, acetylene, hydrogen, and methane, and in a lower part, a first propylene-rich liquid bottom current, which is collected, d) means to send the first ethylene- and ethane-rich head gas current resulting from stage (c) into an zone for acetylene elimination by extraction with a solvent and/or by selective hydrogenation of acetylene by means of the hydrogen contained in the first head gas current, to provide an essentially acetylene-free current, and e) means of cooling and fractionation, in part of a distillation column called the de-methanizer, of the essentially acetylene-free gas current from stage (d) and a second head gas fraction, rich in hydrogen and/or methane, which is collected, and a second ethylene- and ethane-rich bottom liquid fraction, essentially free of acetylene, which is also collected.

BRIEF DESCRIPTION OF DRAWING FIGURES

The invention is described with reference to the attached diagrams, and by showing two modes of embodiment of the invention as nonlimiting illustrations.

In the diagrams:

Figure 1:
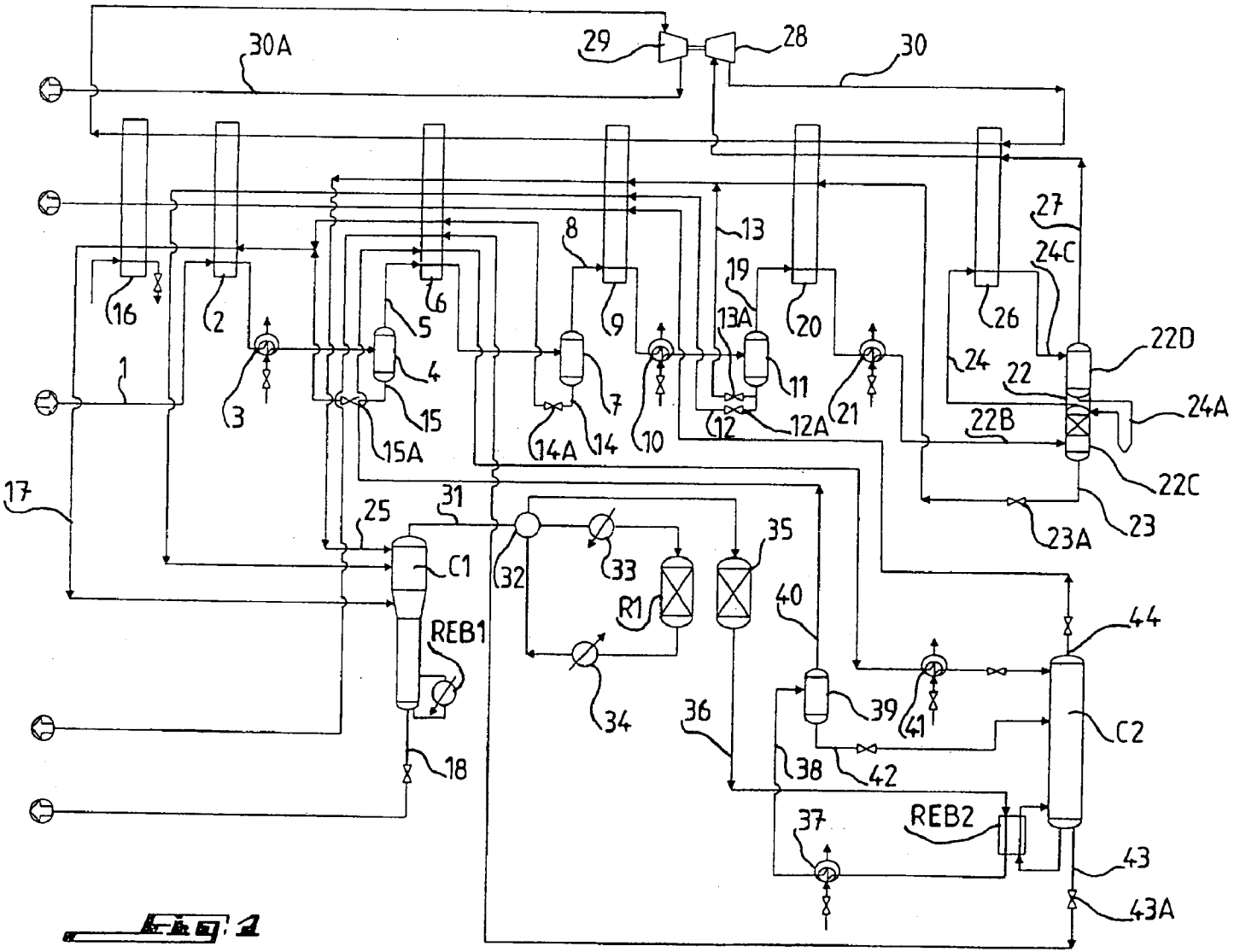
FIG. 1 illustrates schematically the treatment of a gas resulting from pyrolysis of the ethane/propane and/or the liquefied petroleum gas (LPG)

For FIG. 1, the number 1 designates the feed line of the sufficiently dry pyrolysis gas (for example, 10 ppm water) at a pressure that is selected based on the required hydrogen pressure (for example, 15 to 50 bar, preferably between 28 and 38 bar).

The typical composition of a gas obtained by ethane cracking is shown in the table below (in mol %):

| $H_2$ | $CH_4$ | $C_2H_2$ | $C_2H_4$ | $C_2H_6$ | Cut $C_3$ | Cut $C_4$ | $C_{5^+}$ | CO/ $CO_2$ | TOTAL |
|---|---|---|---|---|---|---|---|---|---|
| 36.9 | 5.4 | 0.3 | 34.2 | 21.0 | 0.6 | 0.6 | 1.0 | 0.6 | 100.00 |

This gas is cooled in the multiple-flow beat exchanger 2 and in exchanger 3, respectively, by heat exchange with the cold gases produced by vaporization of the condensates mentioned below and by vaporization of propylene circulating in the traditional cooling loop in a closed circuit.

The partly condensed gas is supplied to separator 4 at a temperature preferably between −30 and −40° C.

The gas 5 collected at the head of the separator 4 is further cooled, in the multiple-flow heat exchanger 6, by the cold gases produced by vaporization of the condensates mentioned below, and additionally by product 43, which is the $C_2$ cut from the bottom of the de-methanizer C2.

The partly condensed gas in the exchanger 6 is then is supplied to the separator 7 at a temperature preferably between −45 and −55° C. The gas 8 collected at the head of the separator 7 is further cooled in the heat exchangers 9 and 10, respectively, by the cold gases, as above, and by vaporization of ethylene circulating in a closed-circuit cooling cycle.

The partly condensed gas is supplied to the separator 11 at a temperature preferably between −65 and −75° C.

The liquid exiting the separator 11 is preferably divided into two parts, product 12 and product 13, previously reduced in pressure respectively, in gates 12A and 13A.

The product 12 flows in countercurrent to the feed gas through the heat exchangers 9, 6, and 2, and is supplied to the top section of the distillation column C1. Product 12 is partly vaporized before being fed into column C1, called the de-ethanizer, because its role is essentially to separate ethane, ethylene, and the lighter top hydrocarbons, and propylene and the heavier fractions at the bottom of the column.

The liquid product 14 from the separator 7 is reduced in pressure in the gate 14A, and flows in countercurrent to the feed gas in the heat exchanger 6, mixes with the pressure-reduced product 15 in gate 15A from the bottom of the separator 4, then flows in countercurrent to the pyrolysis gas into the heat exchanger 2. It is then vaporized by circulating in the multiple-flow exchanger 16. The product heating said exchanger may be propylene from the closed circuit cycle or any other appropriate hot fluid. The product exiting 17 essentially contains the $C_3$ hydrocarbons and the heavier hydrocarbons contained in the feed gas 1, with the exception of those contained in products 12 and 13, and is supplied to column C1 at the level of its middle section. In a variant, products 14 and 15 are sent separately into column C1.

The distillation column C1 is heated by a hot fluid in a heat exchanger REB1, which is, for example, either hot water from the process or low-pressure vapor depending on the temperature, preferably between 60 and 80° C., connected to the bottom composition of the column. The service pressure of the column C1 is preferably between 14 and 24 bar.

The product 18 drawn off the bottom of the column C1 can be treated in the traditional manner to recover the propylene in a unit, not shown, located downstream from the process.

The gas current 19 from the separator 11 is further cooled in a heat exchanger 20 by low-temperature gases as described below, and in the heat exchanger 21 by vaporization of ethylene from a closed-circuit cooling cycle. The partly condensed gas 22B obtained at a temperature between −90 and −100° C. is supplied to the ethylene separator 22 at the bottom part 22C.

The liquid product 23 collected at the foot of the ethylene separator 22 is reduced in pressure in gate 23A, heated by the feed gas in the heat exchanger 20, possibly mixed with product 13 exiting separator 11 and which has been reduced in pressure in gate 13A, and is heated again and partly vaporized in the heat exchangers 9 and 6. The resulting product 25 is the reflux from column C1.

The process and-the equipment described represent the first remarkable characteristics of the invention, in which:

The column C1, which is a de-ethanizer, does not need a top condensation system and the associated equipment.

The head product of column C1 is a $C_2$ cut which contains a certain quantity of methane and hydrogen dissolved in the condensates from the separators 4, 7, 11 and 22. This quantity is lower than in the equivalent columns of the previously known processes, and offers an additional cost advantage.

The pressure of column C1 may be chosen in a range allowing for a low bottom temperature and making it possible to avoid the known phenomena of temperature-related clogging.

Returning now to separator 22, the gas 24 from the head of the lower part 22C of the separator 22 is further cooled in the heat exchanger 26 to a temperature generally lower than −120° C.

The gas 24, cooled and partly condensed, is reintroduced as product 24C into the separator 22 in its upper part 22D, above the lower part 22C. The condensed fraction separated in the upper part 22D of the separator 22 is introduced into a series of pipes 24A equipped with a hydraulic guard, and is then introduced into the top of the lower part 22C.

The gas fraction 27 exiting the top of the upper part 22D of the separator 22 is composed of a mixture of hydrogen, methane, carbon monoxide, and traces of ethylene. The product 27 is heated in the heat exchangers 26 and 20 before it is reduced in pressure in the turbine 28.

The product 30 exiting the turbine 28 is heated by the feed gas in the complete series of exchangers 26, 20, 9, 6, 2, and 16, before it is compressed in the machine 29, which is harnessed to turbine 28. The product 30A is discharged from the process.

The head distillate of column C1, the product 31, is heated in the charge/effluent heat exchanger 32 and in the heater 33 before entering the catalytic reactor R1. The role of this reactor is selective hydrogenation of the small quantity of acetylene, generally less than 1% in moles, and transformation of it into ethylene and ethane. This catalyst system is based on a known type, for example, palladium-based, and does not require additional description. The temperature is, for example 0 to 160° C.

The second notable characteristic of the invention, compared to a known equivalent technique, is the fact that hydrogenation is carried out on a mixture of gas that already contains sufficient hydrogen in addition to the 3 hydrocarbon components of the $C_2$ cut, ethylene, ethane, and acetylene, to accomplish the reaction under moderate and safe conditions. Pure hydrogen need not be added.

The typical composition of product 31 is shown in the following table:

| | $H_2$ | CO | $CH_4$ | $C_2H_4$ | $C_2H_6$ | $C_2H_2$ | $C_{3+}$ | TOTAL |
|---|---|---|---|---|---|---|---|---|
| % mol. | 4.70 | 0.04 | 4.86 | 57.10 | 32.40 | 0.80 | 0.10 | 100.00 |

The advantages over the prior art are as follows:

A lower total volume flow, hence a reduced catalyst volume, because of the presence of a small proportion of hydrogen, for example 4 to 5% in moles of hydrogen (more generally 2 to 10%), compared to 30–40% in the traditional systems.

Safer operation because of the decreased risk of a runaway reaction in the case of uncontrolled exothermic hydrogenation of ethylene.

Addition of purified hydrogen is not needed to supply the reactor.

Catalyst poisons are partly eliminated by condensation and fractionation of the $C_2$ cut in the de-ethanizer. The small quantity of carbon monoxide present in the mixture to be hydrogenated has a beneficial moderating effect on the conduct of the hydrogenation, because this makes it possible to limit the frequency and the rapidity of any runaway reactions that may occur.

The effluent from reactor R1 containing virtually no acetylene is cooled in the heat exchanger 34, then passes through the charge/effluent heat exchanger 32 and the protection dryer 35 containing a dehydrating agent, for example a molecular sieve (zeolite) or similar, to yield a dried gas 36.

The product 36 containing residual hydrogen and methane, in addition to the ethylene and ethane, is cooled in the reboiler REB2 and the column C2 and the subcooler 37 using propylene resulting from a closed-circuit cooling cycle. The partly condensed product 38 is supplied to the separator 39. The gas 40 collected at the head of the separator 39 is then cooled in the heat exchangers 6 and 41, respectively, with cold gases in the multiple flow exchanger 6 and with vaporized ethylene from a closed circuit cooling cycle in the cooler 41, and is supplied to the top of the column C2. The liquid 42 coming from the bottom of the separator 39 is supplied to the middle zone of the column C2. The column C2, called the de-methanizer, operates at a pressure of 10 to 16 bar, separates the components lighter than ethylene at the top, and leaves the purified $C_2$ hydrocarbons in the bottom product 43.

The distillate 44 exiting the head of the column C2 is sent to the heat exchangers 9, 6, 2, and 16 to be heated, and it can finally be recycled to the gas compression system outside the field of application of this invention.

The ethylene-rich bottom product 43 undergoes pressure reduction in gate 43A; it is heated and partly vaporized in the exchanger 6, and can be supplied to a traditional ethylene purification column, not shown.

According to this description, the preferred technology for eliminating acetylene is the hydrogenation performed on the product 31, because the acetylene is transformed into ethylene and ethane, which are products with more economic potential. However, if we wish to preserve the acetylene, a solvent extraction system can be applied to product 31, which would replace the whole circuit of the hydrogenation reactor, with equipment R1, 32, 33, 34, and 35. This constitutes another advantage over the processes using hydrogenation of acetylene over the entire cracking gas, which requires modification to adapt it to a solvent extraction system.

For FIG. 2, the number 1 designates the feed line of the cracking gas having a typical composition indicated below, in mol %, as produced by pyrolysis of naphtha or a similar charge.

| $H_2$ | $CH_4$ | $C_2H_2$ | $C_2H_4$ | $C_2H_6$ | Cut $C_3$ | Cut $C_4$ | $C_{5+}$ | CO | TOTAL |
|---|---|---|---|---|---|---|---|---|---|
| 15.36 | 28.83 | 0.63 | 29.75 | 2.92 | 10.18 | 4.94 | 7.355 | 0.035 | 100.00 |

The description is very similar to that of FIG. 1, and for this reason it is sufficient to define the data that are significantly different from the preceding.

Gas number 1, cooled in heat exchangers 2 and 3, is supplied to the separator 4 at a temperature generally between −15 and −30° C.

Gas 5 is further cooled in the multiple-flow exchanger 6 to a temperature between −20 and −35° C. The gas circulates through a limited number of contact zones in countercurrent to the condensed liquid in the heat exchanger 54, which forms an integral part of the absorption column 7, and it is cooled by the vaporized ethylene coming from a closed-circuit cooling cycle. A variant not shown in FIG. 2, but which can be readily reconstructed by an expert in the field, consists of pumping part of the liquid exiting the separator 11, described below, to the top of the absorption column 7, to generate in this column a liquid product at countercurrent, remaining within the field of application of this invention.

The gas 8, collected at the head of the absorption column 7, containing only small quantities of $C_3$ hydrocarbons and heavier hydrocarbons, is then cooled in the heat exchangers 9 and 10 before being supplied to the separator 11. The liquid product is divided into two parts: the product 12 is partly vaporized in the heat exchangers 9, 6, and 2, and then is supplied to column C1 at an intermediate height. Product 13 is associated with the cold product coming from the exchanger 20, and is heated in the heat exchangers 9 and 6 before being supplied to the top of the column C1.

The liquid product 14 coming from the absorption column 7 is also heated in the heat exchangers 6, 2, and 16, and is supplied to column C1 in intermediate position.

The distillation column C1 is heated by a hot fluid circulating in a reboiler REB1, a fluid which may be hot water from the process or low-pressure vapor, or a combination of the two by the additional use of a second reboiler (not shown, but familiar to an expert in the field).

The residue 18, collected at the foot of the distillation column C1, is treated so that the ethylene and other valuable products can be recovered from it, in downstream units not shown.

The gaseous product 19 coming from the separator 11 is cooled in the heat exchanger 20 by low-temperature gases and in the exchanger 21 by vaporized ethylene from a closed-circuit cooling cycle. The partly condensed gas 22B is supplied to the separator 22 at a temperature of −90 to −100° C.

The liquid product 23 from the separator 22, which has undergone pressure reduction in gate 23A, is heated by the feed gas in the heat exchanger 20, mixes with the product 13 from the separator 11 that has undergone pressure reduction in gate 13A.

Returning now to separator 22, the head gas 24 is cooled in the exchanger 26 to a temperature generally between −110 and −120° C. to provide a fraction 24C which is supplied to the separator 22A. The top part of the separator 22A receives the recycled liquid 50 after pressure reduction in gate 50A which comes from the division of the liquid pumped from the separator 48 into two separate flows. The separator 48 is itself supplied by the distillate 46 from the methane rectifier 45, previously cooled to a temperature generally between −115 and −130° C. in the heat exchanger 47.

The head gas fraction 52 exiting the separator 48 is heated successively in the exchangers 47, 26, 20, 9, 6, 2, and 16, and is then collected. The liquid foot fraction exiting the separator 48 is pumped by a pump 49. Part of the fluid from the pump 49 is sent to a pipe 51 which includes a gate, to the top of the separator 45.

The head gas 27 exiting the separator 22A is a mixture of hydrogen, methane, carbon monoxide and traces of ethylene. This product is heated in the complete series of multiple-flow heat exchangers described above, and it leaves the circuit in the form of crude hydrogen. If necessary, the product 27 can be purified to obtain hydrogen at 95% in a Joule-Thompson system before leaving the limit of this part of the process. In addition, part of product 27 can be mixed with fraction 31 prior to passage into the heater 33, to increase the hydrogen concentration when necessary with a view to hydrogenation of the acetylene in reactor R1.

The liquid product 24A subjected to pressure decrease in gate 24B is heated in the heat exchanger 26, then is mixed with product 23 coming from the separator 22 after pressure decrease in gate 23A. The resulting product 53 is heated in the exchanger 20 by the supply gas, then is mixed with product 13 before it is heated and partly vaporized in the heat exchangers 9 and 6. The resulting product 25 is the reflux for column C1.

As described above, column C1 constitutes the first remarkable characteristic of the invention.

The description of the treatment of product 31 from the heat distillate of column C1 is in all points similar to the description given on FIG. 1, and for this reason it is not repeated here. However, it should be noted that this treatment constitutes the second notable characteristic of the invention.

The typical composition of product 31 is shown in the table below, in mol %:

| | $H_2$ | CO | $CH_4$ | $C_2H_4$ | $C_2H_6$ | $C_2H_2$ | $C_3$+ | TOTAL |
|---|---|---|---|---|---|---|---|---|
| % mol. | 1.42 | 0.015 | 29.12 | 62.14 | 5.99 | 1.31 | 0.005 | 100.00 |

The advantages over the prior art are similar to those described above.

Figure 2:
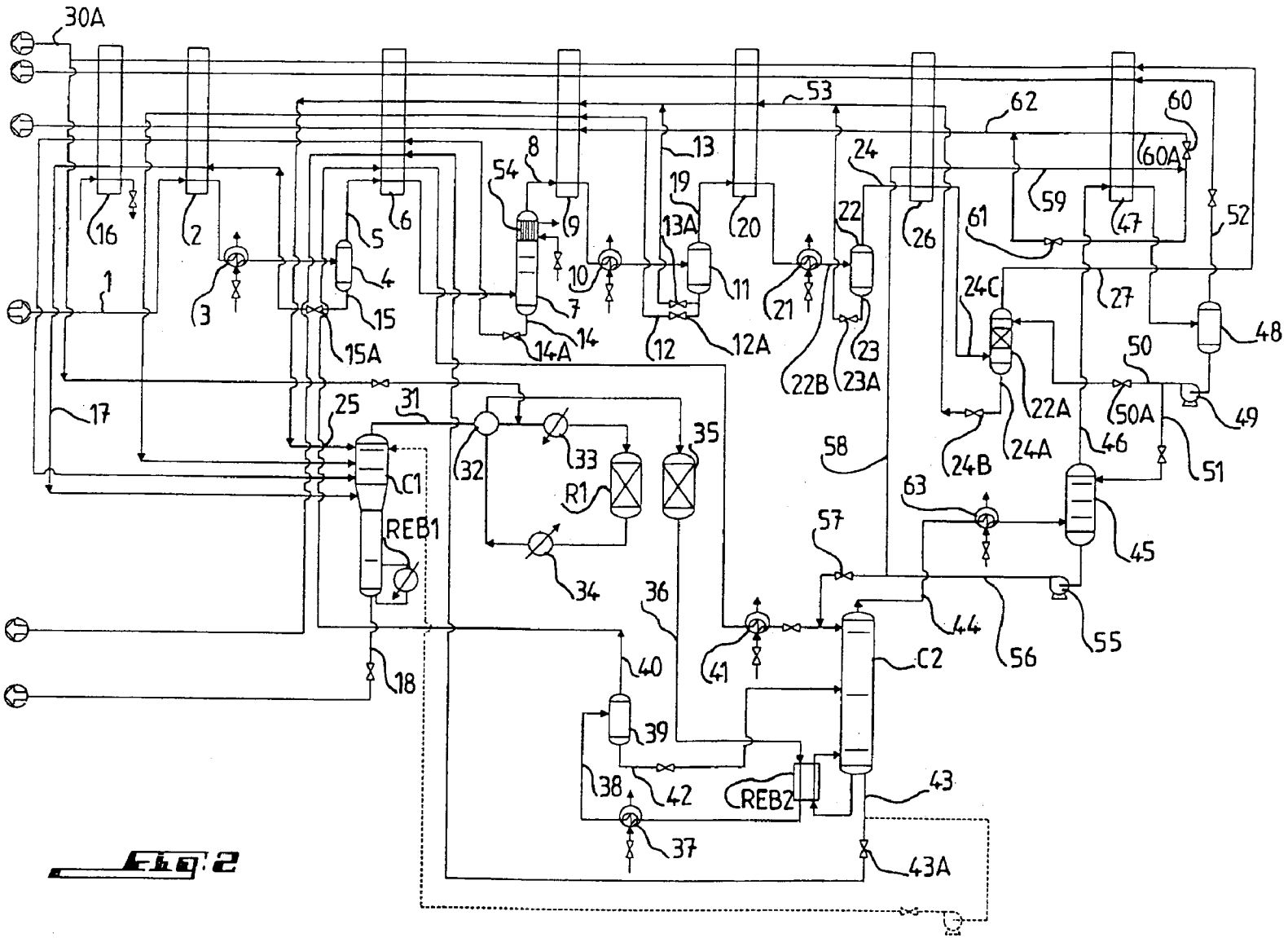
FIG. 2 shows the same treatment applied to the gas resulting from pyrolysis of naphtha and heavier hydrocarbons.

Product 36, containing residual hydrogen, carbon monoxide, and methane in addition to ethylene and ethane, is treated in a manner similar to the description of FIG. 1, and it is detailed in FIG. 2. Because of the greater quantity of methane present in the head distillate 44 of column C2, this product is treated in a methane rectification column 45, the principle of which is known to the expert in the field. Thus gaseous product 44 exiting the head of the demethanization column C2 is introduced into the rectifier 45 after cooling and partial condensation in an exchanger 63, by vaporization of ethylene from a closed-circuit cooling cycle.

The liquid fraction collected at the foot of the rectifier 45 is pumped by the pump 55 to provide a liquid 56. This liquid is separated into a first flow 58, which is cooled in the exchanger 26 to provide the flow 59, and in a second flow which undergoes pressure reduction in a gate 57, to be mixed subsequently with the fraction 40 after cooling in the heat exchangers 6 and 41.

The treatment of the bottom product of column C1 is similar to the treatment described in detail with FIG. 1.

The flow 59 is cooled in the heat exchanger 47, and then is separated into:

a first fluid 60A, passing into a gate 60, which is then heated in the exchanger 47 to supply a fluid 62, and/or a second fluid, passing into a gate 61, and which is then mixed with fluid 60A after heating of the latter in the exchanger 47, to provide the fluid 62.

The latter fluid 62 is then heated in the succession of heat exchangers 26, 20, 9, 6, 2, and 16; in this preferred mode of embodiment, it is finally recycled to the gas compression system outside the field of application of this invention.

The elimination of acetylene from product 31 can be accomplished by absorption and extraction with a solvent instead of hydrogenation, without deviating from the scope of this invention.

The present invention is illustrated and described according to the preferred embodiments, but it is understood that changes and modifications can be made by the expert in the field without deviating from the field of application of the invention.

What is claimed is:

1. A process for fractionation of a substantially anhydrous gas resulting from pyrolysis of hydrocarbons, containing hydrogen and hydrocarbons, particularly hydrocarbons from $C_1$ to $C_3$, including ethylene, propylene, and acetylene, in at least one of a hydrogen and a methane-enriched current, at least one of an ethylene-enriched and an acetylene-poor current, and at least one propylene-enriched current, the process comprising, in stages:

a) cooling and liquefying a gas resulting from pyrolysis of hydrocarbons, progressively, under pressure by passage through a series of increasingly cold successive heat-exchange zones, separating at least one condensate after passage into each heat-exchange zone, at least a first of the condensates being propylene-enriched, and at least a second of the condensates being ethylene- and ethane-enriched, and containing, in solution, a smaller proportion of hydrogen, methane, and acetylene; and collecting a residual hydrogen-rich gas;

b) at least partially evaporating, by a reduction in pressure, the second, ethylene- and ethane-enriched condensate and the first, propylene-enriched, condensate, and heating, in at least one of said successive heat-exchange zones, by thermal exchange with fluids to be cooled, including at least the gas resulting from pyrolysis, to provide, respectively, a first fraction at least partly evaporated due to the reduction in pressure and the heating of the ethylene- and ethane-enriched condensate, and a second fraction at least partly evaporated due to the reduction of pressure and the heating of the propylene-enriched condensate, to provide at least part of the cooling necessary for the cooling and liquefying of the gas resulting from hydrocarbon pyrolysis upon passage into the successive heat-exchange zones successively;

c) introducing the at least partly evaporated first and second fractions resulting from stage (b) into a part of a distillation column called a de-ethanizer, the ethylene- and ethane-rich first fraction which is at least partly evaporated, at a point of said distillation column higher than a point of introduction of the partly evaporated propylene-rich fraction after the partial evaporation, the part of the distillation column operating under conditions of temperature and pressure for separation, in an upper part, of a first head gas current rich in ethylene and ethane and containing, in a smaller proportion, acetylene, hydrogen, and methane, and in a lower part, a first bottom liquid current enriched with propylene, and collecting the first bottom liquid current;

d) sending the first head gas current from stage (c) into an acetylene elimination zone eliminating acetylene by one of extraction with a solvent and selective hydrogenation of acetylene with the hydrogen contained in the first head gas current to provide a current essentially free of acetylene, and e) cooling and fractionating, in a part of a distillation column called the de-methanizer, the current essentially free of acetylene to produce a second head gas fraction enriched with one of hydrogen and methane, collecting the second head gas fraction, and a second bottom liquid fraction, enriched with ethylene and ethane, and essentially free of acetylene, and collecting the second bottom liquid fraction.

2. The process according to claim 1, wherein the gas from hydrocarbon pyrolysis is at a pressure of 15–50 bar, and the distillation column is at a pressure of 10–30 bar and, lower than the pressure of the pyrolysis gas.

3. The process according to claim 1, wherein the evaporated fractions introduced into the de-ethanizer contain dissolved hydrogen in a proportion so that the first head gas current contains 2–10%, in moles, of hydrogen, and, in stage (d), the selective hydrogenation is essentially in ethylene with the hydrogen contained in the first head gas current of stage (c), and the temperature at the hydrogenation ranges from 0° C. and 160° C.

4. The process according to claim 1, including using only hydrogen dissolved in the evaporated fractions introduced into the part of the distillation column called the de-ethanizer for the hydrogenation in stage (d).

5. The process according to claim 1, including obtaining at least two condensates after successive passage of the gas resulting from pyrolysis, respectively, into at least two heat-exchange zones of stage (a) and sending into an upper part of the de-ethanizer of stage (c).

6. The process according to claim 1, including purifying the second head gas fraction exiting the de-methanizer by distillation to recover ethylene and ethane.

7. The process according to claim 1, wherein the gas resulting from pyrolysis is a gas from pyrolysis of one of ethane and an ethane/propane mixture, and including mixing the second head gas fraction exiting the de-methanizer with the gas resulting from pyrolysis without ethylene recovery, for treatment in mixture with the gas resulting from pyrolysis in stage (a).

8. The process according to claim 1, including increasing hydrogen content of the first head gas current exiting the de-ethanizer by addition of hydrogen from a separator, separating a partly condensed fluid produced by refrigeration, in a heat-exchange zone, of a residual gaseous fluid flowing from the successive heat-exchange zones.

9. The process according to claim 1, including recycling part of the second liquid bottom fraction from the de-methanizer into the de-ethanizer, to reduce acetylene concentration of the first head gas current from the de-ethanizer.

10. The process according to claim 1, including, in stage (d), extracting acetylene with a solvent.

11. The process according to claim 1, wherein the first head gas current includes carbon monoxide in a concentration moderating effect on reaction catalysis in the acetylene elimination zone.

12. An apparatus for fractionation of a gas resulting from pyrolysis of hydrocarbons containing hydrogen and hydrocarbons, including ethylene, propylene, and acetylene, in at least one of a hydrogen and a methane-rich current, at least one of an ethylene-rich and acetylene poor current, and at least one propylene-rich current, the apparatus including:

a) means for progressively cooling and liquefying the gas from the pyrolysis of hydrocarbons, under pressure, by passage into a series of increasingly colder successive heat-exchange zones, means for separating from the pyrolysis gas at least one condensate after passage into each heat-exchange zone, a first of the condensates being propylene-enriched and a second of the condensate being ethylene- and ethane-enriched and containing, in solution, a smaller proportion of hydrogen, methane, and acetylene, and means for collecting a residual hydrogen-rich gas;

b) means for evaporating, at least in part, by a reduction of pressure, the second, ethylene- and ethane-enriched condensate and the first, propylene-enriched condensate and means for heating the condensates, independently, in at least one of the successive heat-exchange zones by thermal exchange with fluids to be cooled, to provide, respectively, a first fraction at least partly evaporated, resulting from the reduction of pressure, and means for heating the ethylene- and ethane-enriched condensate, and a second fraction at least partly evaporated, resulting from the reduction of pressure and the heating of the propylene-enriched condensate, to provide for progressive cooling and liquefaction of at least the gas from the-pyrolysis of hydrocarbons upon successive passage through the successive heat-exchange zones;

c) means for introducing the partially evaporated first and second fractions from (b) into a part of a distillation column called a de-ethanizer, the ethylene- and ethane-enriched partly evaporated first fraction being admitted at a point of the part of the distillation column higher than a point of introduction of the propylene-rich partly evaporated second fraction, the part of the distillation column operating under conditions of temperature and pressure for separating, in an upper part, a first ethylene- and ethane-rich head gas current containing, in a smaller proportion, acetylene, hydrogen, and methane, and, in a lower part, a propylene-rich first bottom liquid current, which is collected;

d) means for sending the first ethylene- and ethane-rich head gas current from (c) into an acetylene elimination zone for elimination of acetylene by one of extraction with a solvent and selective hydrogenation of acetylene with hydrogen contained in the first head gas current, to provide a current essentially free of acetylene, and e) means for cooling and fractionating, in a part of a distillation column called a de-methanizer, the gas current essentially free of acetylene from (d), in a second hydrogen-and/or methane-enriched head gas fraction, which is collected, and a second bottom liquid fraction which is enriched with ethylene and ethane and is essentially free of acetylene, and which is also collected.

* * * * *